United States Patent
Fujiwara et al.

(10) Patent No.: US 6,374,026 B1
(45) Date of Patent: Apr. 16, 2002

(54) MANUFACTURE OF PLANAR WAVEGUIDE AND PLANAR WAVEGUIDE

(75) Inventors: Takumi Fujiwara; Akira Ikushima, both of Nagoya (JP)

(73) Assignees: Toyota Jidosha Kabushiki Kaisha, Toyota; Toyota School Foundation, Nagoya, both of (JP)

(*) Notice: Subject to any disclaimer, the term of this patent is extended or adjusted under 35 U.S.C. 154(b) by 0 days.

(21) Appl. No.: 09/254,672

(22) PCT Filed: Sep. 10, 1997

(86) PCT No.: PCT/JP97/03186

§ 371 Date: Mar. 16, 1999

§ 102(e) Date: Mar. 16, 1999

(87) PCT Pub. No.: WO98/12592

PCT Pub. Date: Mar. 26, 1998

(30) Foreign Application Priority Data

Sep. 17, 1996 (JP) ............................................. 8-244965

(51) Int. Cl.⁷ ............................... G02B 6/00; G02B 6/10
(52) U.S. Cl. ........................ 385/122; 385/129; 385/2; 359/240
(58) Field of Search ................................ 385/122, 129, 385/130, 2, 3, 8, 14, 16, 123; 359/240, 245

(56) References Cited

U.S. PATENT DOCUMENTS

| | | |
|---|---|---|
| 4,035,058 A | 7/1977 | Papuchon |
| 4,080,244 A | 3/1978 | Auracher et al. |
| 4,136,439 A * | 1/1979 | Auracher et al. ............ 29/624 |
| 5,235,659 A | 8/1993 | Atkins et al. |
| 5,239,407 A * | 8/1993 | Brueck et al. ............... 359/326 |
| 5,287,427 A | 2/1994 | Atkins et al. |
| 5,478,371 A | 12/1995 | Lemaire et al. |
| 5,617,499 A * | 4/1997 | Brueck et al. ............... 385/122 |
| 5,966,233 A * | 10/1999 | Fujiwara et al. ............. 359/240 |
| 6,037,105 A * | 3/2000 | You et al. .................... 430/321 |
| 6,094,291 A * | 7/2000 | Kashyap ...................... 359/245 |

FOREIGN PATENT DOCUMENTS

| | | |
|---|---|---|
| JP | 51-94974 | 8/1976 |
| JP | 52-123250 | 10/1977 |
| JP | 52-123251 | 10/1977 |
| JP | 8-81231 | 3/1996 |
| WO | 96/16344 | 5/1996 |

OTHER PUBLICATIONS

Optical fiber communication '95 Technical digest vol. 8 Postconference Edition, Mar., 1995, T.Fujiwara et al. "UV–excited poling and electrically tunable bragg gratings in a germanosilicate fiber" pp. 347–350 (See ISR & IPER Written Reply).

Papers I from the Electronics Society convention of IEICE, 1996 (Aug. 8, 1996) Seiichi Kashimura et al., "C–161 Study of PLC Grating Core firm " p. 161 (see ISR,IPER).

(List continued on next page.)

Primary Examiner—Frank G. Font
Assistant Examiner—Layla Lauchman
(74) Attorney, Agent, or Firm—Pillsbury Winthrop LLP (57) ABSTRACT

A metal film (12) is formed on the surface of a glass substrate (10) and etched to form a pair of electrodes (12a and 12b) which face each other with a certain gap therebetween (S11~S13). The substrate (10) is doped with germanium, etc, by using the electrodes (12a and 12b) as a mask to form a core part (14, S14). Then a high voltage is applied between the electrodes while ultraviolet radiation is applied and the core part (14) is subjected to ultraviolet-driven boring to give the optical nonlinearity to the core part (14, S15). The voltage application to the core part (14) having the optical nonlinearity is controlled to control a light transmitting through the core part (14).

4 Claims, 6 Drawing Sheets

OTHER PUBLICATIONS

Papers I from the Electronics society convention of IEICE, 1996 (Aug. 8, 1996), T.Tanaka et al," C–303 Hybrid Integrated Laser Using UV Grating Prepared in Quartz Waveguide and Spot–size Convention LD " p. 303 (See ISR & IPER W. Rep.

Electro–Optic–modulation–in germanosilicate Fibre with UV–excited poling, T.Fujiwara et al, Electronics Letters Mar. 30, 1995, vol. 31 No. 7, pp. 573–574 (See also appln. p. 2).

* cited by examiner

MANUFACTURE OF PLANAR WAVEGUIDE AND PLANAR WAVEGUIDE

This application is the national phase of international application PCT/JP97/03186 filed Sep. 10, 1997 which designated the U.S.

FIELD OF THE INVENTION

The present invention relates to a planar waveguide having optical nonlinearity and particularly to one which makes use of ultraviolet excitation poling.

BACKGROUND OF THE INVENTION

With recent advances in information processing technology involving computers and the like, the need and desire to process and transmit massive amounts of data (mass-data) at high speeds have increased. Currently, optical fiber transmission is the most effective means for mass-information transmission and has become widely used.

Optical fiber transmission works by transmitting optical signals through optical fiber. In order to transmit signals through optical fiber, elements such as a light source, a light receiving element, an optical signal generator, an optical switch/coupler, transmission optical fiber, and the like are necessary. An electrooptical effect (optical nonlinearity, a phenomenon which results from nonlinear polarization generated in a substance by light) is then used for an optical functional element such as an optical signal generator, an optical switch and the like. Therefore, an optical switch element and the like are produced by controlling electric field strength applied to an optical nonlinear material to change intensity or direction of light transmitted into the optical nonlinear material.

Optical fiber transmission of information can be achieved by applying optical modulation to light introduced into the optical fiber on the basis of information to be transmitted by making use of an optical functional element and then demodulating the light signal on the light-receiving side.

Crystalline materials such as $LiNbO_3$, $BaTiO_3$ and the like are now commonly used as an optical nonlinear material because there are, at present, no other materials that can realize sufficient nonlinearity.

On the other hand, from the standpoint of stable connection with glass-made optical fiber, low losses in transmitted light, reduction of cost, wide range of transmitted wavelength and the like, it is preferable to construct an optical functional element such as an optical switch or the like from a glass material.

Accordingly, attempts have been made to impart optical nonlinearity in glass materials. For example, ultraviolet excitation poling by irradiating a glass material with ultraviolet light in a state where high electric field of approximately $10^6$ V/cm is applied is described in "ELECTRONICS LETTERS Mar. 30, 1995 Vol.31 No.7 pp.573–574".

It is believed that ultraviolet excitation poling is able to impart to a glass material optical nonlinearity equal to that of a crystalline material, which may then be preferably used as an optical functional element.

Although according to the conventionally proposed ultraviolet excitation poling described above, nonlinearity may be given to the glass materials, that nonlinearity is given only to a definite area of the core of the optical fiber. Therefore, only the possibility of availability for an optical functional element is shown.

Further, although an optical fiber optical functional element has additional advantages such as simple connection for transmission, functions are limited and shape dependent. On the other hand, a planar waveguide is also able to form plural waveguides, and a diversification of processing function may be attempted. It is considered that if optical nonlinearity may be given to the glass-made substrate, a planar waveguide preferable for various applications can be obtained.

DESCRIPTION OF THE INVENTION

The present invention has been achieved in light of the aforementioned problems and its objective is to present a process for producing a planar waveguide by giving optical nonlinearity to a glass-made substrate to realize a planar waveguide having optical nonlinearity.

The process for producing a planar waveguide according to the present invention is characterized in that a pair of electrodes of conducting material is arranged at a gap corresponding to core area of waveguide on the surface of the glass-made substrate and the surface of the glass-made substrate is irradiated with ultraviolet light through said gap in a state where voltage is applied between these electrodes so that ultraviolet excitation poling is applied to the core area.

According to the present invention as outlined above, an optical nonlinearity is introduced to the core area of the surface of the glass substrate by applying the ultraviolet excitation poling thereto. Therefore, a variety of functions can be effected by controlling the electric field applied to the core area having the optical nonlinearity. Further, since the nonlinearity can be given to only a part of the glass substrate, such effects as low cost, easiness of connection with glass-made optical fiber and the like can be obtained. Particularly, since the nonlinearity coefficient more than several P m/V similarly to that of $LiNbO_3$ can be obtained according to the ultraviolet excitation poling to the glass, and its response to electric field becomes sufficient for application.

The present invention is also characterized in that a step for forming a conducting metal film on the surface of the glass substrate, a step for etching the metal film thus formed to form a pair of electrodes at a determined gap, a step for introducing specified atoms in the surface of the substrate under the aforementioned gap using the electrodes thus formed as masks to form core area, and a step for irradiating the core area with ultraviolet light in a state where voltage is applied between the pair of electrodes to effect ultraviolet excitation poling are completed to give optical nonlinearity to the core area.

As described above, by forming the core area after the metal film is etched, the core area can be formed under the gap between the electrodes, and the ultraviolet excitation poling can be easily and certainly applied to desired area of optical waveguide.

The present invention is further characterized in that the irradiation with ultraviolet light to the aforementioned core area is carried out through a given phase mask, and parts having optical nonlinearity are formed periodically in the core area.

As described above, gratings can be formed in the core area by discontinuous irradiation with ultraviolet light. Light of a specified wavelength (Bragg wavelength) can then be reflected and interfered by these gratings. As the Bragg wavelength varies according to applied voltage, it is possible to make the core area operate as, for example, a wavelength switch.

In particular, according to the present invention, the gratings can be easily formed using a simple process of limiting the area to be irradiated with ultraviolet light using a phase mask.

The planar waveguide of the present invention can also be characterized by its inclusion of a glass substrate, a pair of electrodes formed on the substrate through a determined gap, a core area which is formed on the surface of the substrate under the gap between the pair of electrodes and the refractive index of which is different from that of the substrate by addition of specified atoms, and the aforementioned core area being given optical nonlinearity of 1 pm/V or above as the electro-optical coefficient.

PREFERRED EMBODIMENT FOR WORKING THE PRESENT INVENTION

The preferred embodiment for working the present invention (herinafter referred to as the working embodiment) will be described below with reference to the appended drawings.

Figure 1:
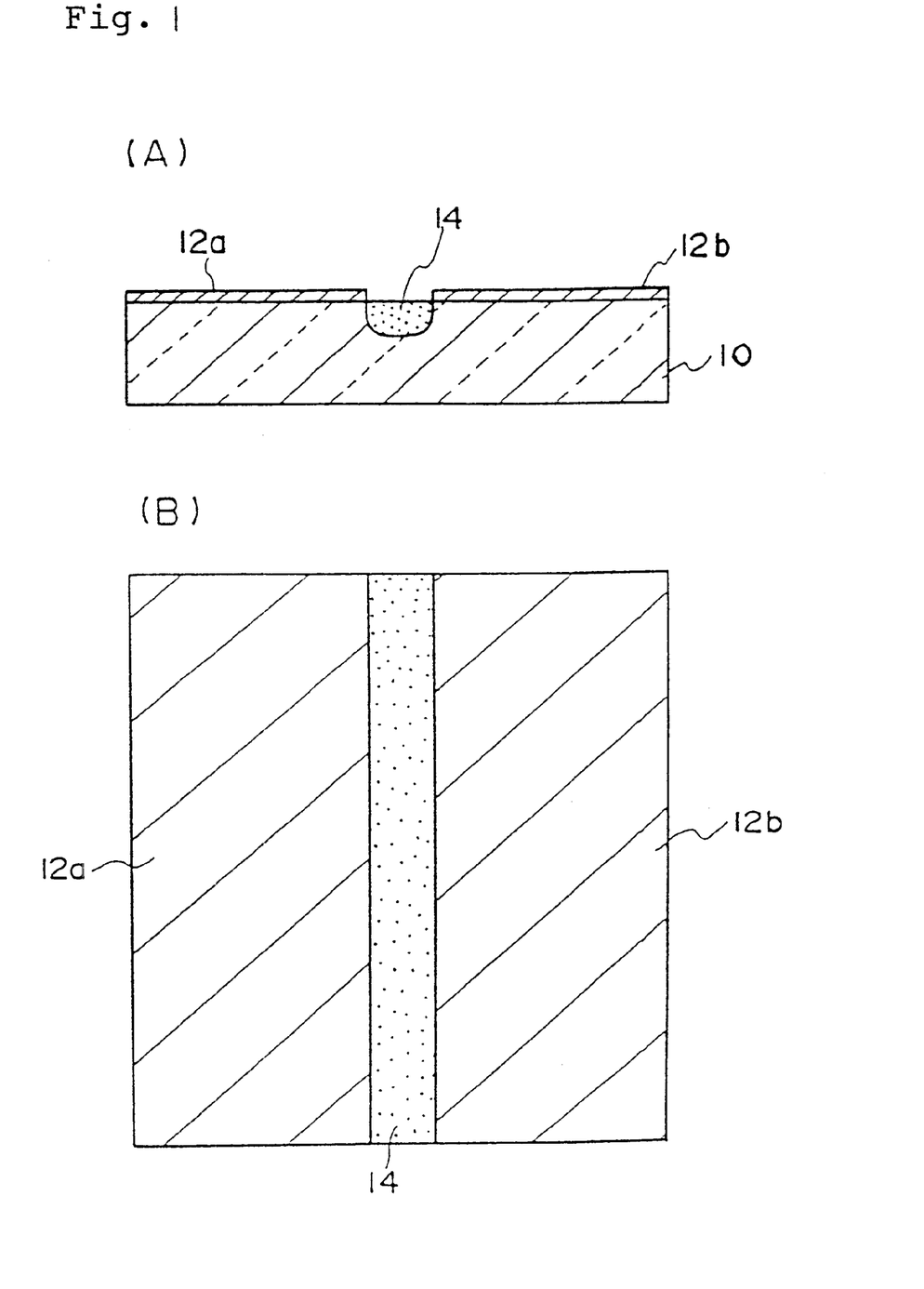
FIG. 1 is a view illustrating the structure of a planar waveguide of a working embodiment of the present invention.

FIG. 1 is a schematic view illustrating the structure of a planar waveguide of the present invention. A glass substrate 10 is made of silica glass ($SiO_2$) in the form of a plate and a pair of electrodes 12a and 12b are formed on its surface. These electrodes 12a and 12b may be made of, for example, a thin film of aluminum (Al). Core area 14, doped with germanium (Ge) or a similar material with an adjusted refractive index, is formed under the gap between the pair of electrodes 12a and 12b.

Optical nonlinearity is then introduced to the core area 14 by means of ultraviolet excitation poling, thereafter making it possible to control the optical properties of the core area 14 using a voltage applied between the electrodes 12a and 12b. Accordingly, the light passing into the core area 14 is controlled by voltage applied between the electrodes 12a and 12b and the planar waveguide operates as an optical functional element.

Process for Production

Figure 2:
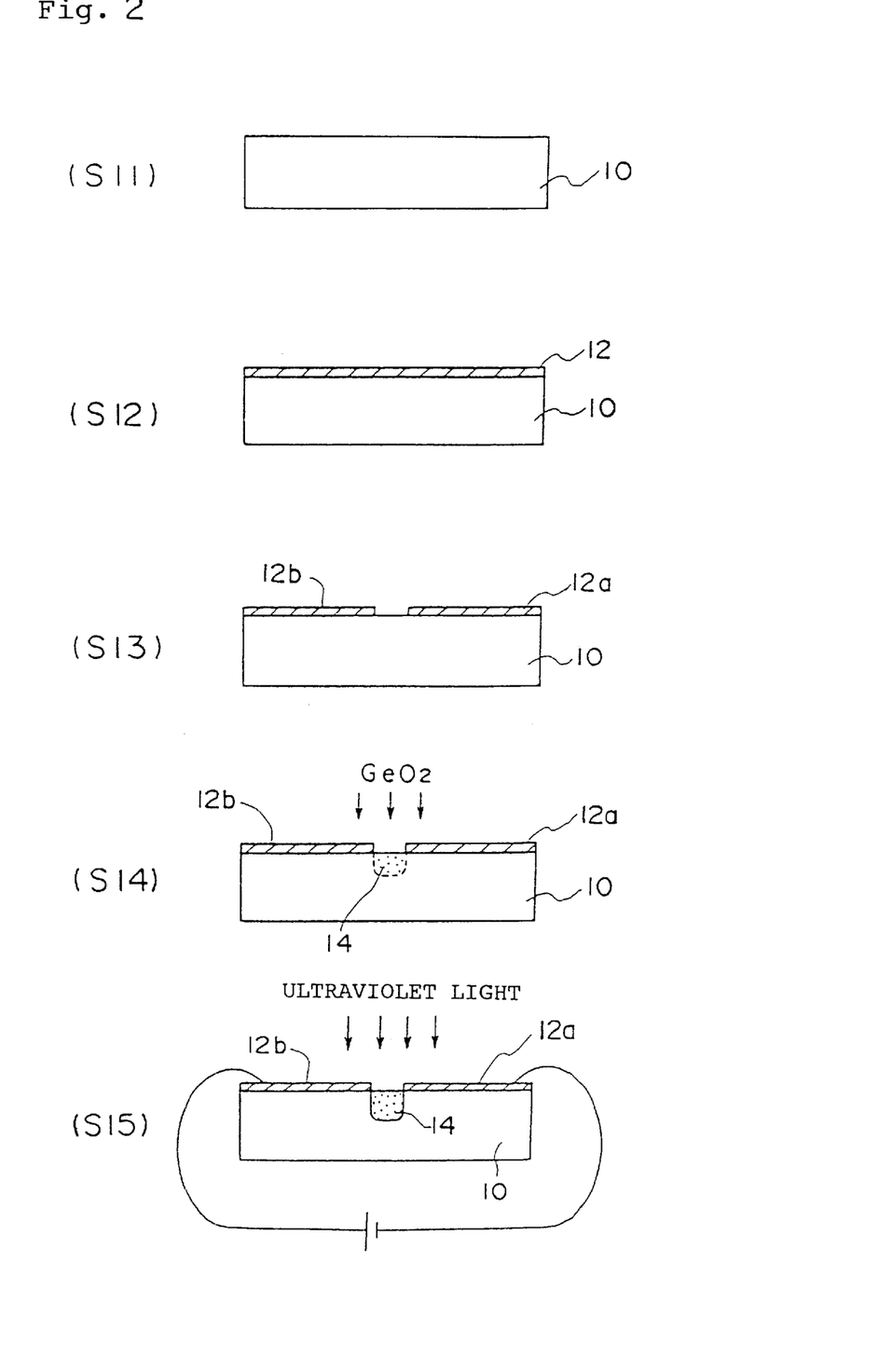
FIG. 2 is a view illustrating the steps for producing a planar waveguide.

FIG. 2 outlines a process for production of such a planar waveguide. First, a substrate 10 made of a silica glass plate is prepared (S11). Then, a metal film 12 is formed on the surface of the substrate 10 (S12). This is carried out, for example, by placing the glass substrate 10 in a vacuum chamber and depositing a metal on the surface of the glass substrate 10. This metal to be deposited may be, for example, aluminum. Methods other than deposition may also be used to form the metal film 12.

Next, a determined portion of the metal film 12 is removed by etching, thereby forming two electrodes 12a and 12b (S13). In this example, a straight gap is formed between both electrodes 12a and 12b and etching is carried out by means of photolithography, etc. That is to say, a resist is formed by deposition over the entire surface of the metal film 12, and then the resist is irradiated with light through a mask pattern to expose only the desired area of the resist.

Next, doping of $GeO_2$ (germanium oxide) is carried out using the electrodes 12a and 12b as a mask (S14). By this doping of germanium oxide the, core area 14, which operates as a waveguide with a refractive index different from the surrounding areas, is formed in the doped area. In such a manner as described above, the core area can be accurately formed in the area between the electrodes and ultraviolet excitation poling can be accurately performed on the core area. The core area may, of course, be easily be formed in any suitable shape, while the positions of the electrodes will of necessity correspond to the core area. When an element having an unrestricted waveguide is formed, germanium oxide or the like are added to the whole of the glass substrate 10, and its refractive index is adjusted. Doping step S14 is therefore omitted. In this example, the gap is established by approximately 10 $\mu$m.

As described above, when the electrodes 12a and 12b are formed, irradiation with ultraviolet light is carried out in a state where a determined high voltage is applied between the electrodes 12a and 12b, and the ultraviolet excitation poling treatment is applied to the core area 14 (S15).

That is to say, a voltage of about 1 kV is applied between the electrodes 12a and 12b. An electric field of about $10^6$ V/cm is now applied to the core area 14. In this state, a pulsed ArF excimer laser (wavelength 193 nm) is used to irradiate the core area 14 with ultraviolet light. The energy density, repetitive interval of pulse and irradiation time of this laser are about 36 $mJ/cm^2$, about 10 pps (pulse/second) and about 10 to about 30 minutes, respectively.

However, there is a danger of discharge in an area facing to the gap between the electrodes 12a and 12b. It is, therefore, preferable to carry out the ultraviolet excitation poling in vacuo. In this way, discharge between the electrodes 12a and 12b can be prevented and effective ultraviolet excitation poling can be achieved.

In the manner described above, optical nonlinearity can be given to the core area 14. That is to say, with the above ultraviolet excitation poling treatment, a primary electrooptical coefficient (r) of approximately 6 pm/V can be obtained in the core area. This is a value comparable to that of $LiNbO_3$ and the like, and is sufficient for the formation of an optical functional element.

The electrodes 12a and 12b which were used in order to apply voltage at the time of ultraviolet excitation poling in the planar waveguide remain on the substrate and can be used to apply a desired electric field to the core area 14. It is thereafter a simple process to impart and operate any combination of a variety of functions.

While the ultraviolet excitation poling was applied to only one place in the present illustrative example, it may also be preferable that the electrodes 12a and 12b be independently formed at preferable locations on the glass substrate 10, and that an elemental region having optical nonlinearity be formed on each place on the glass substrate 10.

Modification

Figure 3:
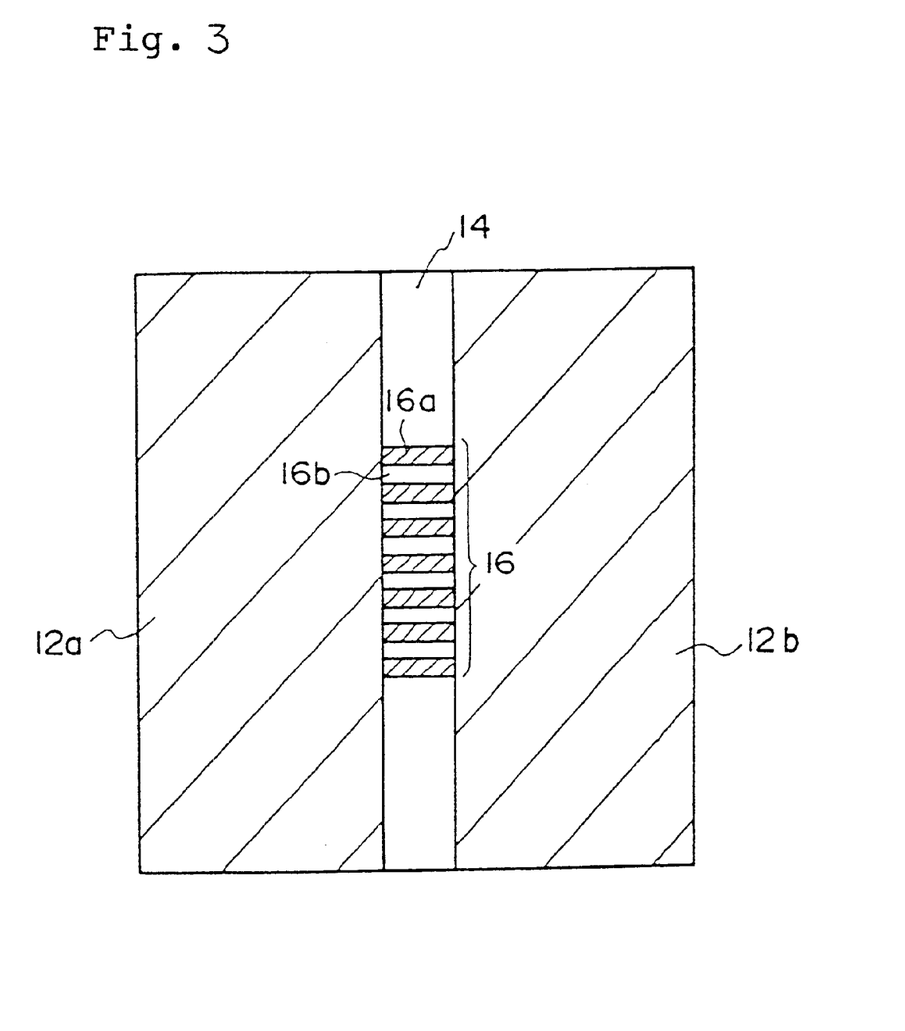
FIG. 3 is a view illustrating the structure of a planar waveguide having gratings.

It may also be preferable to configure the present invention by forming alternate and periodic regions having optical nonlinearity and usual regions on the core area 14, and to use these as grating sections. That is to say, as shown in FIG. 3, the nonlinear regions 16a having a different refractive index and secondary nonlinearity are formed on the core area 14 perpindicular to the lengthwise direction at predetermined intervals and with specified width to form the grating section 16 along with the usual regions 16b. Therefore, light which is transmitted through the core area 14 in its lengthwise direction is reflected and interfered by the grating section 16.

The refractive index of the nonlinear region 16a can be altered by controlling the voltage applied between the electrodes 12a and 12b. The wavelength of reflected and interfered light then becomes different, and the wavelength of the light which intercepts the transmission can then be controlled by applied voltage and this modification can be utilized as a wavelength switch or a wavelength selection element.

Figure 4:
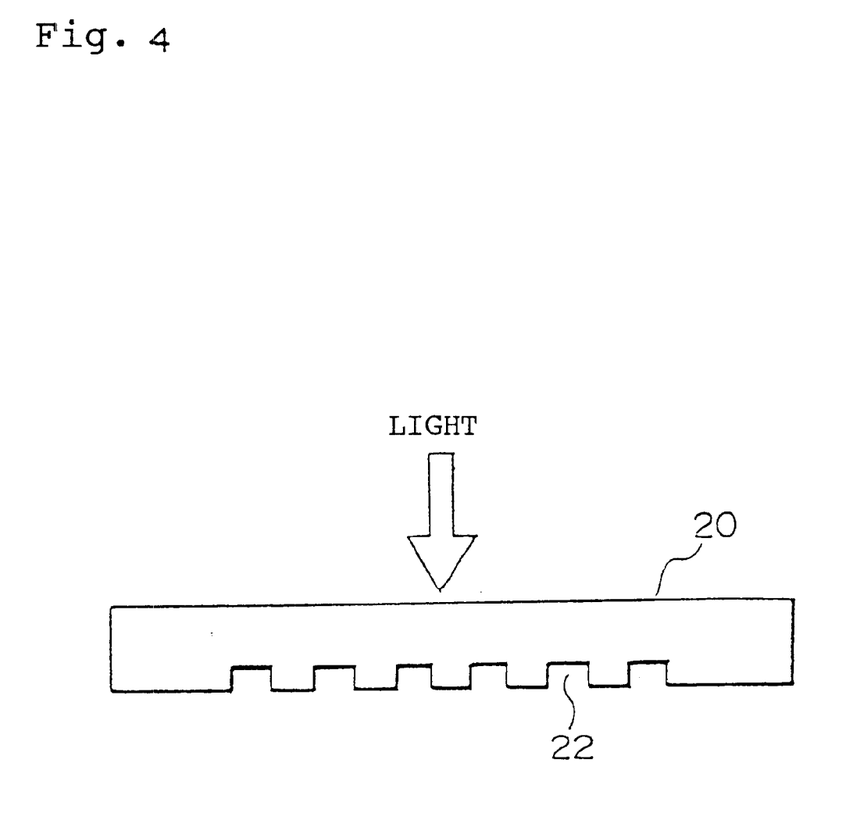
FIG. 4 is a view illustrating the structure of a phase mask.

A planar waveguide as described above may be formed in such a manner as will be describe below. That is to say, optical fibers are irradiated with ultraviolet light laser through a phase mask at the time of the aforementioned ultraviolet excitation poling. One example of the structure of the phase mask is illustrated in FIG. 4. As shown in FIG. 4, a plurality of grooves 22 are formed on the surface of one side of the plate substrate 20. The grooves 22 are formed in parallel with each other and at predetermined spacings. Accordingly, a predetermined diffraction phenomenon occurs when parallel light is transmitted through the grooves, with high and low intensities of the light being repeated at predetermined spacings. That is to say, fringe patterns (zebra patterns) are formed, in which light-irradiated regions and non-light-irradiated regions are periodically repeated. Further, desired places can be irradiated with desired ultraviolet light by using a plurality of phase masks. The substrate 20 of the phase mask may, for example, be made of silica glass ($SiO_2$) which transmits ultraviolet light.

Accordingly, the optical nonlinearity can be given only to the places irradiated with ultraviolet light and such the planar waveguide as shown in FIG. 3 can be formed.

And, when a voltage, particularly negative voltage (several hundred V, approximately) is applied to such a planar waveguide in a state where light of various wavelengths is conducted thereto, the wavelength intercepted by such a waveguide shifts. Therefore, this waveguide may be utilized as a wavelength switch. With respect to positive and negative of voltage, the electric field opposite to poling electric field may be taken as positive.

As mentioned above, the transmission strength of light of the specific wavelength decreases at the grating element because Bragg reflection occurs in the grating and light of the Bragg wavelength is reflected.

Further, the Bragg wavelength shifts when a voltage is applied and the Bragg reflection increases or decreases according to the applied voltage because the core area 14 at the region irradiated with ultraviolet light comes to have the nonlinearity by the ultraviolet excitation poling and the primary electrooptical effect occurs and the effective reflective index of the waveguide changes.

Variation in refractive index by the electrooptical effect ($\Delta n_{EO}$) can represented by the following equation;

$\Delta n_{EO} = -n^3 rE/2$. In this equation, n is the refractive index of the core area of fiber, r is the primary electrooptical effect coefficient and E is electric field strength.

Bragg wavelength ($\lambda_B$) is then represented by $\lambda_B = \Lambda n_{eff}$, wherein $\Lambda$ is a pitch of the grating. And, in the consideration on the basis of coupling of forward and backward (reflection) guided light, the peak reflectance (R) is represented by $R = \tan h^2 (\kappa L)$, and 3 dB band width ($\Delta\lambda$) is represented by $$\Delta\lambda = \lambda_B \{\pi^2 + (\kappa L)^2\}^{0.5}/2n_{eff}L$$

Wherein, $\kappa$ is the coupling coefficient of forward and backward (reflection) guided light, and is represented by $\kappa = \pi n_c \delta n \eta / \lambda_B n_{eff}$. Wherein L is length of the grating element.

Also, $n_{eff}$ is effective refractive index of guided light at the grating section, $n_c$ is the refractive index of cladding, $\delta n$ is the magnitude of change in the refractive index forming periodic structure, and $\eta$ is overlapping integral in forward and backward transmission modes.

Therefore, $n_{eff}$, $\delta n$ and $\eta$ change depending upon $\Delta n_{EO}$.

The relationship between the variation in the effective refractive index ($\Delta n_{EO}$) and the applied voltage was studied experimentally from the relationship between the changes in the voltage applied and the changes in the Bragg wavelength. As the result, the effective refractive index ($n_{eff}$) has a determined negative slope to the changes in the voltage applied and changes linearly. That is to say, the effective refractive index decreases depending upon an application of voltage and the Bragg wavelength shifts to the side of short wavelength.

And, in such the planar waveguide as described above, the changes in the Bragg wavelength ($\Delta\lambda_B$) to electric field (1V/$\mu$m) is approximately 0.01 nm.

As described above, there is a linear relationship between the applied voltage and the effective refractive index and it is understood that the Pockels effect (the primary electrooptical effect) on the basis of the secondary optical nonlinearity is obtained.

It is, therefore, possible to switch light of a specific wavelength by shifting the Bragg wavelength by an application of voltage to control the transmission and non-transmission of laser light. Particularly, the planar waveguide of the present working embodiment is made of glass. Therefore, the connection with conventional optical fiber may be easily carried out. That is to say, the connection by adhesive, laser fusing, melt-connection and the like can be easily carried out. Further, the transmittance of light at the element may be sufficiently maintained and mode mismatch is prevented.

Still further, the Bragg wavelength may be shifted in multiple steps by successively changing voltage applied. Thereby, this may be also utilized as a wavelength selection element by controlling the transmitted wavelength.

Furthermore, in the present embodiment, the spacings of the grating may be easily controlled by the phase mask. Therefore, the grating element having desired Bragg wavelength may be easily obtained.

Another Structure

The planar waveguide of the present invention may be utilized in a variety of functional elements. For example, it may be preferable as shown in FIG. 5 to design a structure where the core area 14 is once divided to two branches which rejoin each other, and the electrodes 12a and 12b are placed respectively to the branched portions so as to apply voltage.

With such a structure, it is possible to control the phases of two branched two light rays by controlling the voltage applied to the two branched portions, and it is therefore possible to effect the attenuation of output light by shifting the phases of both 180 degree and optical strength modulation.

Figure 5:
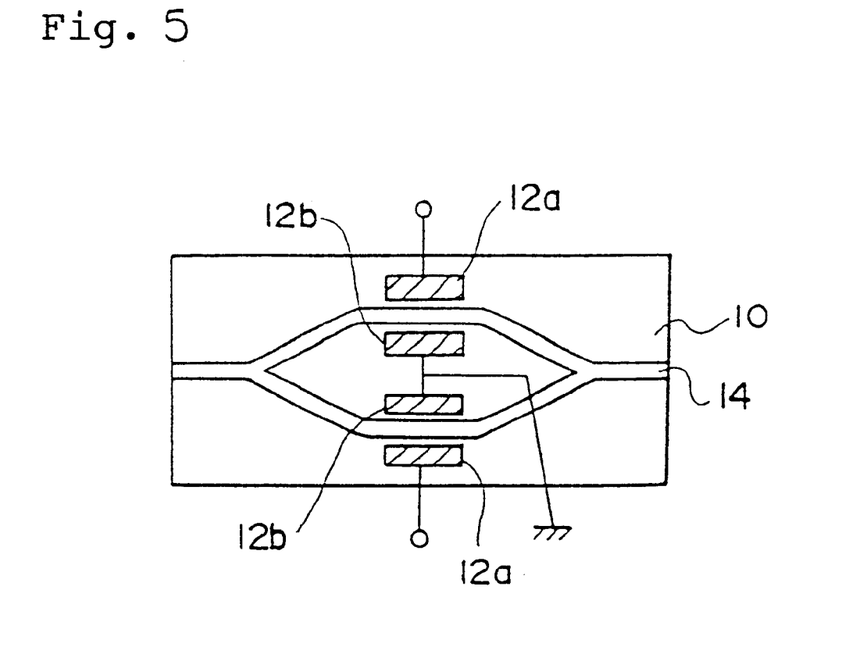
FIG. 5 is a view illustrating an example of an optical functional element.
Figure 6:
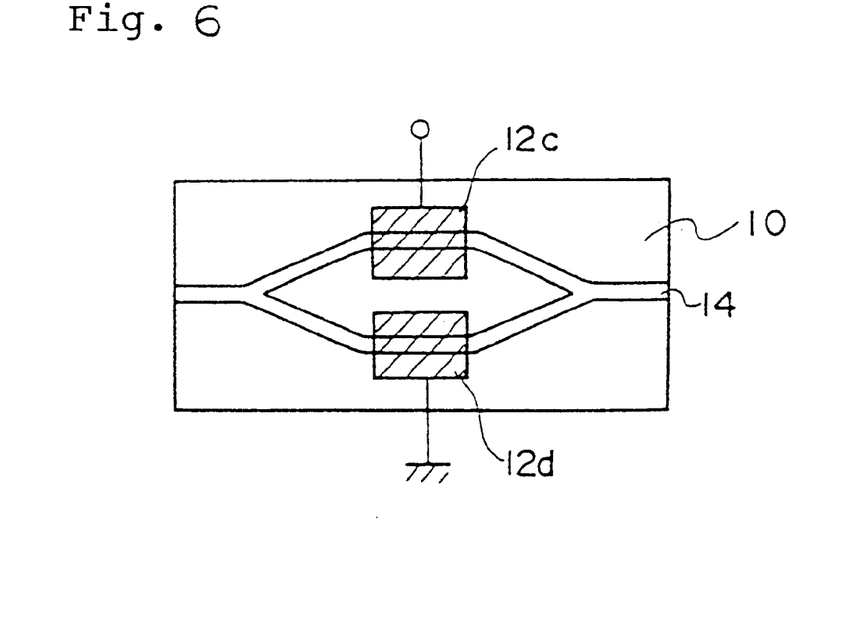
FIG. 6 is a view illustrating an example of an optical functional element.

Arrangement of electrodes is not restricted to the arrangement shown in FIG. 5, and electrodes 12c and 12d may also be placed on the core area 14 as shown in FIG. 6. In this case, the electrodes 12c and 12d may be preferably formed after removal of the electrodes 12a and 12b which have been used at the time of ultraviolet light poling. With such the structure, modulation similar to that described above may be effected.

According to the planar waveguide of the present invention, portions having optical nonlinearity may be formed on any desired area of the glass substrate 10. Therefore, various kinds of optical functional elements and optical functional circuits may be formed.

Figure 7:
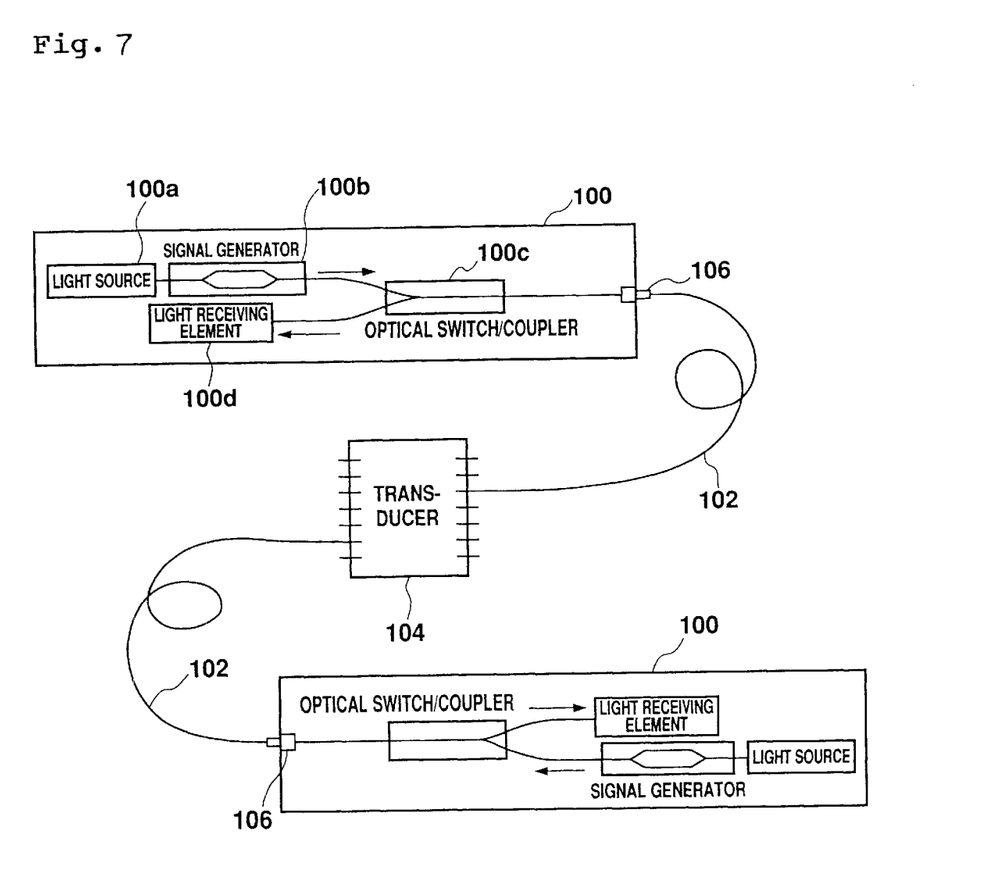
FIG. 7 is a view illustrating an example of structure of system.

For example, a signal generator, an optical switch/coupler, or the like for the two-way optical transmission system shown in FIG. 7 may be configured using the planar waveguide of the present invention. That is to say, two terminals 100 are shown in the system illustrated in FIG. 7 (there are a number of terminals 100 in conventional systems). These terminals 100 are connected with optical fiber 102 via a transducer 104. The transducer 104 controls the connection of desired optical fiber 102.

Each terminal 100 comprises a light source 100*a*, a signal generator 100*b*, an optical switch/coupler, and a light receiving element 100*d*. The light source 100*a* is a laser source generating a specific light, and the signal generator 100*b* optically modulates that light to include the information to be transmitted. The optical switch/coupler 100*c* transmits the optical signals generated from the signal generator 100*b* to the transmission optical fiber 102 at the time of transmission and supplies the optical signals generated from the transmission optical fiber 102 to the light receiving element 100*d* at the time of receiving. The light receiving element 100*d* transduces input optical signals to electric signals. The information transmitted may be demodulated by modulating the electric signals obtained by the light receiving element 100*d*. An optical connector 106 connects the terminal 100 with the transmission optical fiber 102.

As described above, a transmission system making use of optical fiber may be made up, and the planar waveguide of the present invention may be preferably utilized with the signal generator 100*b*, the optical switch/coupler 100*c*, or the like.

Industrial Applicability

The present invention may be utilized for an optical functional element such as an optical signal generator, an optical switch/coupler, or any similar element in an optical fiber transmission system.

What is claimed is:

1. A process for producing a planar waveguide characterized in that a pair of electrodes made of a conducting material are arranged on the surface of a glass substrate at a gap corresponding to a core area of the waveguide, and the surface of the glass substrate is irradiated with ultraviolet light through said gap in a state where voltage is applied between the electrodes to apply ultraviolet excitation poling to said core area.

2. A process for producing a planar waveguide comprising;

a step of forming a conducting metal film on the surface of a glass substrate, a step of etching the metal film thus formed to form a pair of electrodes spaced at determined gap, a step of injecting specified atoms on the surface of the substrate under said gap using the electrodes formed as masks to form a core area, and a step for irradiating the core area with ultraviolet light while voltage is applied between said pair of electrodes to effect ultraviolet excitation poling and impart optical nonlinearity to the core area.

3. A process for producing a planar waveguide described in claim 2, wherein the irradiation of said core area with ultraviolet light is effected through a specific phase mask to form periodic regions having optical nonlinearity in the core area.

4. A planar waveguide comprising;

a glass-made substrate, a pair of electrodes formed on the substrate via a determined gap, and a core area formed on the surface of the substrate under the gap between the pair of electrodes, the refractive index of which is different from that of the substrate due to addition of specified atoms, and said core area being given optical nonlinearity of 1 pm/V or above as electrooptical coefficient.

* * * * *